(12) United States Patent
Gupta et al.

(10) Patent No.: US 12,718,540 B2
(45) Date of Patent: Aug. 25, 2026

(54) SYSTEMS AND METHODS FOR TWO-STAGE 3D OBJECT DETECTION NETWORK FOR SENSOR FUSION

(71) Applicant: TOYOTA MOTOR ENGINEERING & MANUFACTURING NORTH AMERICA, INC., Plano, TX (US)

(72) Inventors: Rohit Gupta, Santa Clara, CA (US); Qi Chen, San Jose, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 18/471,221

(22) Filed: Sep. 20, 2023

(65) Prior Publication Data

US 2025/0095345 A1 Mar. 20, 2025

(51) Int. Cl.
*G06V 10/80* (2022.01)
*B60W 50/00* (2006.01)
(Continued)

(52) U.S. Cl.
CPC ....... *G06V 10/803* (2022.01); *B60W 50/0097* (2013.01); *B60W 60/0015* (2020.02);
(Continued)

(58) Field of Classification Search
CPC .... G06V 10/803; G06V 20/58; G06V 20/647; G06V 10/25; G06V 10/82;
(Continued)

(56) References Cited

U.S. PATENT DOCUMENTS 11,398,097 B2 7/2022 Zhang
11,531,088 B2 * 12/2022 Popov .................... G06N 3/045
(Continued)

FOREIGN PATENT DOCUMENTS

WO WO-2023006836 A1 * 2/2023 ........... G06V 10/764

OTHER PUBLICATIONS

Nabati et al., "Radar-Camera Sensor Fusion for Joint Object Detection and Distance Estimation in Autonomous Vehicles," 12th International Workshop on Planning, Perception and Navigation for Intelligent Vehicles (IROS 2020), pp. 129-134, Oct. 25, 2020 (https://www-sop.inria.fr/members/Philippe.Martinet/proceedings/ProceedingsPPNIV20.pdf).
(Continued)

*Primary Examiner* — Ig T An
(74) *Attorney, Agent, or Firm* — SHEPPARD, MULLIN, RICHTER & HAMPTON LLP; Daniel N. Yannuzzi

(57) ABSTRACT

Systems and methods are provided that implement two-stage three-dimensional (3D) object detection, which includes a distinct fusion of radar data and camera data. The radar data includes a four-dimensional (4D) millimeter-wave (MMW) radar point cloud, and the camera data includes a high-resolution image in the two-dimensional space (2D). Thereafter, a 3D ROI proposal is fused with 2D image data generating a 2D proposal projection. The 2D proposal projection comprises proposals that predict the position of objects in the high-resolution image. In some cases, proposals in the 2D proposal projection correspond to anchors in the 3D ROI proposal. Then, 2D object detection results are fused with the 3D ROI proposal to generate 3D object detection results. Two-stage 3D object detection allows vehicles to detect objects in a 3D space of the driving environment to navigate safely, avoid obstacles, and respond
(Continued)

to dynamic changes in the surrounding environment while operating autonomously.

20 Claims, 6 Drawing Sheets

(51) Int. Cl.

| | |
|---|---|
| ***B60W 60/00*** | (2020.01) |
| ***G01S 13/86*** | (2006.01) |
| ***G01S 13/89*** | (2006.01) |
| ***G01S 13/931*** | (2020.01) |
| ***G06T 7/11*** | (2017.01) |
| ***G06T 7/194*** | (2017.01) |
| ***G06T 7/73*** | (2017.01) |
| ***G06V 20/58*** | (2022.01) |
| ***G06V 20/64*** | (2022.01) |

(52) U.S. Cl.
CPC ............ *G01S 13/867* (2013.01); *G01S 13/89* (2013.01); *G01S 13/931* (2013.01); *G06T 7/11* (2017.01); *G06T 7/194* (2017.01); *G06T 7/73* (2017.01); *G06V 20/58* (2022.01); *G06V 20/647* (2022.01); *B60W 2420/403* (2013.01); *B60W 2420/408* (2024.01); *B60W 2554/4029* (2020.02); *B60W 2554/4041* (2020.02); *G06T 2207/10028* (2013.01); *G06T 2207/30261* (2013.01)

(58) Field of Classification Search
CPC ......... B60W 50/0097; B60W 60/0015; B60W 2420/403; B60W 2420/408; G01S 13/867; G01S 13/89; G01S 13/931; G01S 7/415; G01S 13/42; G01S 13/58; G06T 7/11; G06T 7/194; G06T 7/73
See application file for complete search history.

(56) References Cited

U.S. PATENT DOCUMENTS

| | | | | |
|---|---|---|---|---|
| 2021/0241026 | A1* | 8/2021 | Deng | G01S 7/497 |
| 2022/0398851 | A1* | 12/2022 | Nehmadi | G01S 7/4808 |

OTHER PUBLICATIONS

Cui et al., "Deep Learning for Image and Point Cloud Fusion in Autonomous Driving," IEEE Transactions on Intelligent Transportation Systems, Feb. 2022, 23(2):722-739 (https://doi.org/10.1109/TITS.2020.3023541).

Scheiner et al., "Object Detection for Automotive Radar Point Clouds—A Comparison," AI Perspectives 3:6, pp. 1-23, Nov. 16, 2021 (https://doi.org/10.1186/s42467-021-00012-z).

Shuai et al., "milliEye: A Lightweight mmWave Radar and Camera Fusion System for Robust Object Detection," Proceedings of the International Conference on Internet-of-Things Design and Implementation (IoTDI 2021), May 2021, pp. 145-157 (https://doi.org/10.1145/3450268.3453532).

* cited by examiner

Figure 3:
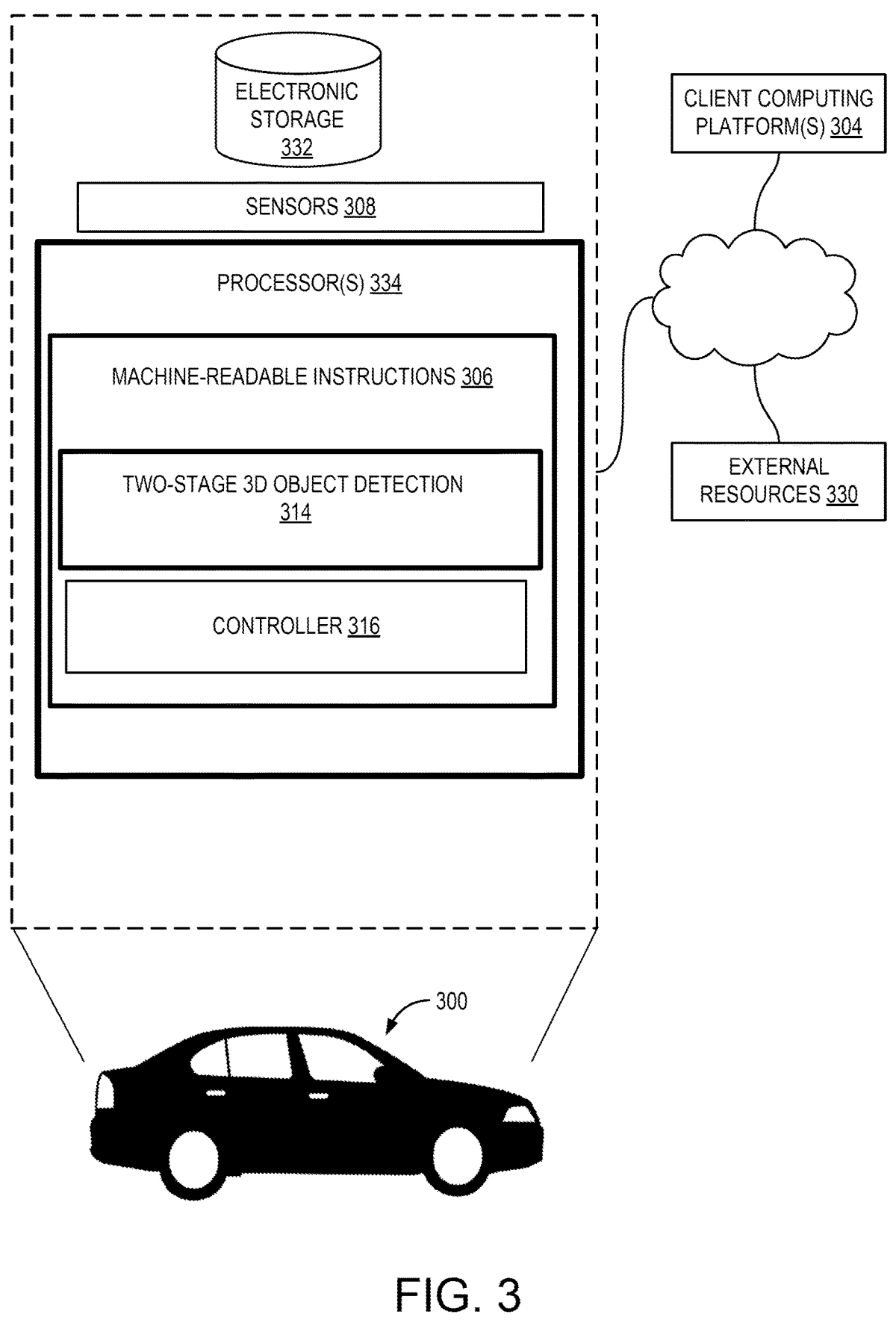

ELECTRONIC STORAGE 332

SENSORS 308

PROCESSOR(S) 334

MACHINE-READABLE INSTRUCTIONS 306

TWO-STAGE 3D OBJECT DETECTION 314

CONTROLLER 316

CLIENT COMPUTING PLATFORM(S) 304

EXTERNAL RESOURCES 330

500
SENSORS 552
V. ACCEL. 512
V. SPEED 514
WHEEL SPIN 516
TPMS 520
ROLL/PITCH/YAW 522
CLEARANCE 524
L/R F/R SLIP RATIO 526
ENVIRONMENTAL 528
OTHER 532
TWO-STAGE 3D OBJECT DETECTION 520
501
514
WIRELESS TRANSCEIVER CIRCUIT 502
WIRED I/O INTERFACE 504
MEMORY 508
PROCESSOR 506
503
ASSIST SWITCH 505
POWER SUPPLY 512
GPS/VEH POS SYSTEM 572
TORQUE SPLITTER(S) 574
ICE CONTROL CIRCUIT 576
COOLING SYSTEM 578
OTHER 582
SUSPENSION SYSTEM 580
VEHICLE SYSTEMS 558

SYSTEMS AND METHODS FOR TWO-STAGE 3D OBJECT DETECTION NETWORK FOR SENSOR FUSION

TECHNICAL FIELD

The present disclosure relates generally to systems and methods supporting sensor fusion capabilities which may be applicable to automotive applications, for example fusing data from camera sensors and radar sensors to provide a two-stage three-dimensional (3D) object detection usable for autonomous vehicle control.

DESCRIPTION OF RELATED ART

Sensor fusion is the process of combining data from multiple sensors to obtain a more accurate, comprehensive, and reliable understanding of the environment or object being observed. By integrating information from various types of sensors, such as camera, LiDAR (Light Detection and Ranging), radar, and GPS (Global Positioning System), the system can overcome the limitations of individual sensors and create a more robust representation of the world.

In the realm of autonomous vehicles, vehicle sensors can be utilized to create a more complete picture of the surroundings, enabling the vehicle to make informed decisions and navigate safely. By leveraging data from different sensors, the system can compensate for blind spots, reduce uncertainties, and improve overall perception. Additionally, sensor fusion is utilized in various other fields, including robotics, virtual reality, augmented reality, and other applications where accurate and perception information is essential.

BRIEF SUMMARY OF THE DISCLOSURE

In accordance with embodiments of the disclosed technology, a system for two-stage 3D object detection using sensor fusion is implemented. A system can be implemented within a vehicle, where the vehicle includes sensors that captures camera data and radar data. The camera data and the radar data may be associated with a driving environment of the vehicle including one or more objects. The vehicle can also include a controller performing fusion of the camera data and the radar data to generate a three-dimensional (3D) object detection result including a position of the one or more objects in a 3D space associated with the driving environment of the vehicle. The controller can further execute autonomous control of the vehicle based on the 3D object detection result, where the autonomous control is associated with the driving environment.

In accordance with embodiments of the disclosed technology, a method for two-stage 3D object detection using sensor fusion is implemented. The method can involve receiving camera data and radar data. The camera data and the radar data may be associated with a driving environment of the vehicle including one or more objects. Further, the method involves fusing of the camera data and the radar data to generate a three-dimensional (3D) object detection result including a position of the one or more objects in a 3D space associated with the driving environment of the vehicle. Thereafter, the method executes autonomous control of the vehicle based on the 3D object detection result, where the autonomous control is associated with the driving environment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 depicts an example vehicle implementing the two-stage 3D object detection system shown in FIG. 1, according to one embodiment.

The figures are not exhaustive and do not limit the present disclosure to the precise form disclosed.

DETAILED DESCRIPTION

Autonomous vehicles and other automotive applications, such as advanced driver-assist systems (ADAS), can utilize information from the car's surrounding environment to perform various functions, for example executing an autonomous driving maneuver to avoid a pedestrian. An autonomous vehicle uses object detection as a fundamental perception technology to understand its surroundings and make informed decisions for safe and efficient navigation. Object detection allows the vehicle's on-board computer system to identify and track various objects in real-time, such as pedestrians, vehicles, cyclists, traffic lights, traffic signs, and other potentially pertinent objects. Moreover, object detection supports a plethora of features used by vehicles, including autonomous vehicles, such as lane detection, traffic sign and signal detection, path planning and navigation, collision avoidance, intersection assistance, parking assistance, and the like.

Object detection can be achieved through a combination of sensors such as camera, LiDAR, radar, and ultrasonic sensors. The data from these sensors can be fused together to build a comprehensive understanding of the environment, enabling the vehicle to perceive the world around it and make informed decisions about its movements. The accuracy and reliability of object detection play a critical role in the overall safety and performance of autonomous vehicles. Continuous advancements in computer vision and deep learning techniques are constantly improving the capabilities of object detection systems in autonomous vehicles. The disclosed two-stage 3D object detection system and method implements a distinct fusion of radar data and camera data. Furthermore, the two-stage 3D object detection system and method realize an enhanced 3D object detection having increased accuracy and reliability, thereby allowing vehicles to navigate safely, avoid obstacles, and respond to dynamic changes in the surrounding environment while operating autonomously.

Figure 1:
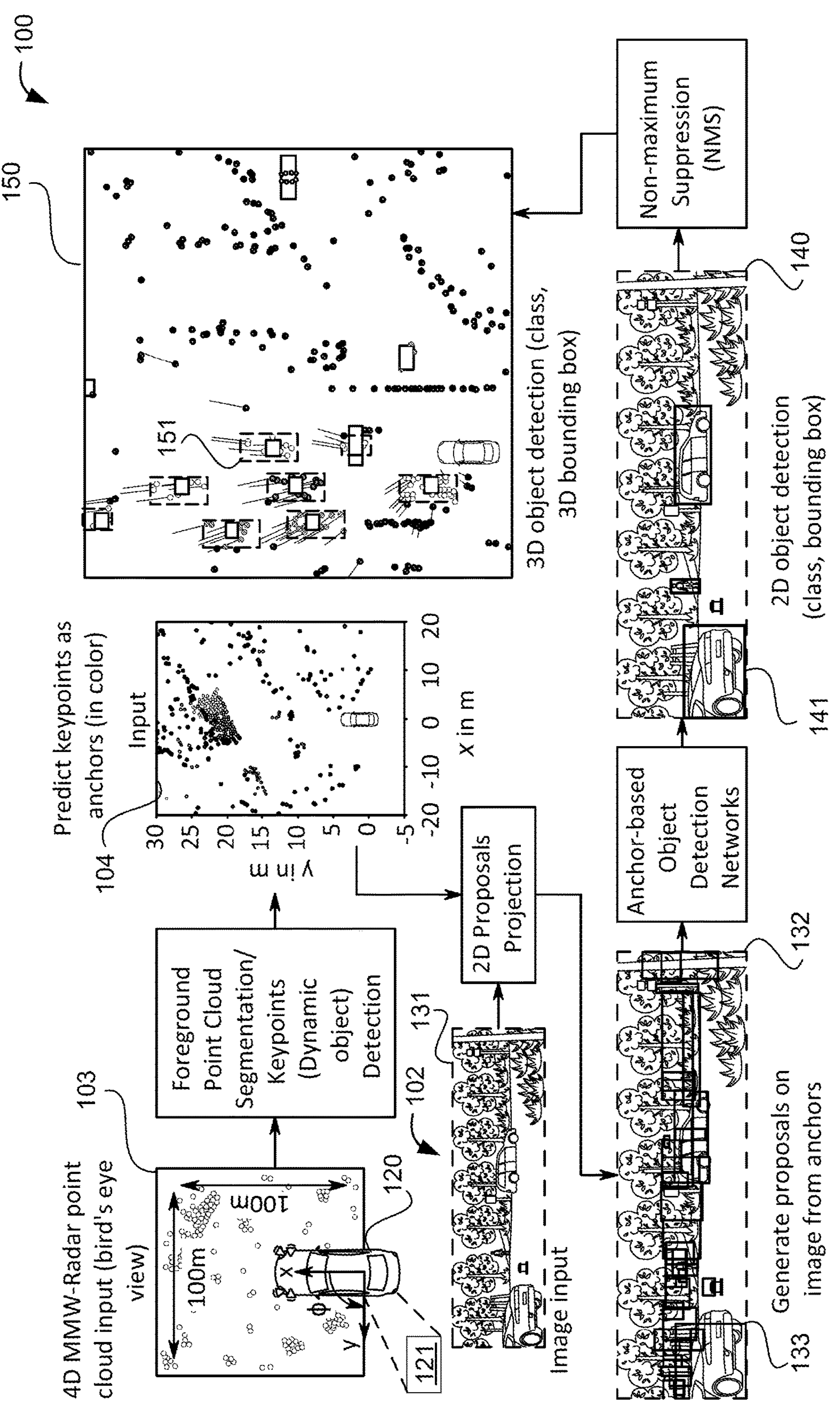
FIG. 1 depicts an example illustration of a vehicle environment implementing a two-stage 3D object detection system performing a 3D object detection including data fusion, according to one embodiment.

FIG. 1 is a diagram of an example environment 102 in which the disclosed two-stage 3D object detection system 100 and functions are implemented. In the example of FIG. 1, a vehicle 120 is depicted. The two-stage 3D object detection system 100 is distinctly designed to implement an accurate and reliable 3D object detection capability that fuses together data from camera sensors and radar sensors in a manner that provides a comprehensive understanding of the surrounding environment 102 in 3D. As seen, the two-stage 3D object detection system 100 ultimately generates a 3D object detection result 150 as a 3D scene (from radar imagery) of the vehicle's 120 surroundings including 3D bounding boxes 151 that represent the spatial position (x,y,z) of each detected objected in the 3D space. Consequently, the two-stage 3D object detection system 100 generates an accurate 3D object detection result 150 that can be utilized by the vehicle 120, for instance by ADAS and/or autonomous vehicle controls, in order to achieve safe and efficient vehicle operations. Although the embodiments herein are described in reference to vehicle applications (e.g., autonomous vehicles), it is not intended to be limiting, and the disclosed two-stage 3D object detection system and functions are applicable to other applications that can leverage precise 3D object detection capabilities, such as robotics, augmented reality, and the like.

In an embodiment, vehicle 120 can be an autonomous vehicle. As used herein, "autonomous vehicle" means a vehicle that is configured to operate in an autonomous operational mode. "Autonomous operational mode" means that one or more computing systems of the vehicle 120 are used to navigate and/or maneuver the vehicle along a travel route with a level of input from a human driver which varies with the operational mode. As such, vehicle 120 can have a plurality of autonomous operational modes, with a varied level of automated response. In some embodiments, the vehicle 120 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 120, responses to 3D object detection can be highly, or fully, automated. For example, vehicle 120 can include a two-stage 3D object detection controller 121 that is configured to communicate controls so as to operate the vehicle 120 autonomously and safely. For example, after the two-stage 3D object detection controller 121 detects objects in the 3D space and generates a corresponding autonomous control, the vehicle 120, operating as an autonomous vehicle, can automatically perform the necessary adjustments (e.g., lane change) with any human driver interaction. Accordingly, vehicle 120 can operate with respect to computer-controlled safety commands, or controls (based on 3D object detection) in a fully autonomous manner.

Alternatively, or in addition to the above-described modes, vehicle 120 can have one or more semi-autonomous operational modes. "Semi-autonomous operational mode" means that a portion of the navigation and/or maneuvering of the vehicle 120 along a travel route is performed by one or more computing systems, and a portion of the navigation and/or maneuvering of the vehicle 120 along a travel route is performed by a human driver. One example of a semi-autonomous operational mode is when an adaptive cruise control system is activated. In such case, the speed of a vehicle 120 can be automatically adjusted to maintain a safe distance from a vehicle ahead based on data received from on-board sensors, but the vehicle 120 is otherwise operated manually by a human driver. Upon receiving a driver input to alter the speed of the vehicle (e.g., by depressing the brake pedal to reduce the speed of the vehicle), the adaptive cruise control system is deactivated, and the speed of the vehicle is reduced. Thus, with vehicle 120 operating as a semi-autonomous vehicle, the response to a 3D object detection result can be partially automated. Alternatively, the vehicle 120 may notify a driver that driver input is necessary in response to a 3D object detection result.

In the example of FIG. 1, the autonomous vehicle 120 is equipped with radar sensors. For example, multiple radar sensors can be strategically placed around the vehicle 120. The vehicle's 120 radar sensors can emit radio waves and/or microwave pulses, and then receive the reflections from surrounding objects that are also physically located in the driving environment 102 and within a proximity to vehicle 120 (e.g., within the operational range of the vehicle's 120 radar sensors). In other words, when a radar sensor receives echoes from reflective waves it effectively detects the presence of an object. Accordingly, each of the vehicle's 120 radar sensors can obtain radar data, where the radar data can include information about the distance, velocity, and angle for each detected objected.

Additionally, the vehicle 120 has signal processing capabilities, which allows objects to be detected from the signals obtained by its radar sensors (e.g., radar echoes). The radar sensors enable radar-based object detection, where the vehicle 120 can identify objects such as other vehicles, potential obstacles, pedestrians, and other relevant entities within the vicinity of the autonomous vehicle 120. According to the embodiments, the radar-based capabilities of vehicle 120 also includes radar point cloud generation. For example, vehicle 120 has a radar system that combines the spatial information (x,y,z) corresponding to each of the detected objects and creates a 3D point cloud representation that indicates the presence and/or location of the detected objects relative to the environment 102. Each object that is detected by the vehicle's 120 radar system is represented as a point in the 3D point cloud, with its position in the 3D space based on the radar sensor's range and angle measurements.

In particular, FIG. 1 depicts vehicle 120 generating a four-dimensional (4D) millimeter-wave (MMW) radar point cloud 103 from the radar data its on-vehicle radar sensors have obtained. Thus, the vehicle 120 is equipped with MMW radar sensor technology to capture information about objects in 4D within its surroundings, including position (x, y, z) and velocity (or motion) of the objects which allows it to generate a multi-dimensional visualized scene (e.g., bird's eye view) of the environment 102. By capturing velocity information, the 4D MMW radar point cloud 103 can provide valuable data about the dynamic behavior of objects, such as their relative speed and direction of movement.

Additionally, FIG. 1 illustrates that the 4D MMW radar point cloud 103 is analyzed in order to predict key points as anchors. Key points can be dynamic objects in radar data. Because the 4D MMW radar point cloud 103 obtains information related to motion of the detected object, this data indicating movement can be used to detected key points. For example, the environment 102 in FIG. 1 includes the presence of stationary objects that do not move, such as trees and traffic signals, and dynamic objects that may be in motion, such as pedestrians and other vehicles. Using the 4D MMW radar point cloud 103, it can be determined which of the objects by radar have movement, which would enable objects in the environment 102 like pedestrians and vehicles to be detected as key points in the radar data. In other words, dynamic objects are identified as the significant points in the 4D MMW radar point cloud 103, as opposed to the stationary objects. In some embodiments, foreground point cloud segmentation is used to separate the foreground or relevant objects from the background objects within the 4D MMW radar point cloud 103. For instance, in the 4D MMW radar point cloud 103, the foreground points can correspond to the dynamic objects, which may be indicative of objects of interest, such as vehicles and pedestrians, which is separated from the background of 4D MMW radar point cloud 103 that incudes objects such as trees.

Also, FIG. 1 shows a 3D region of interest (ROI) proposal 104 representation of the radar data. FIG. 1 illustrates that the 3D ROI proposal 104 includes a plurality of anchors which represent the predicted key points. As a general description, each anchor in 3D ROI proposal 104 is associated with the presence and/or location of a dynamic object within the radar image. Accordingly, the 3D ROI proposal 104 can be generated as a subset (or portion) of the 4D MMW radar point cloud 103 that is identified as potentially containing the key point objects, or anchors.

According to the embodiments, the vehicle 120 also has the capability to obtain camera data, which can be fused with the aforementioned radar data using the two-stage 3D object detection system 100. For example, the vehicle 120 can be equipped with camera sensors, such as high-resolution cameras that are situated at strategic positions about the vehicle 120 (e.g., front, back, side, roof, etc.) to provide a comprehensive view of the surrounding environment 102. The vehicle 120 can then employ its on-vehicle cameras to continuously capture high-resolution images and video of the surrounding environment 102 as the vehicle 120 is being operated, for instance being driven along a roadway. FIG. 1 depicts an input image 131 as an example of camera data that may be obtained by the vehicle 120 of its surrounding environment. As an example, the input image 131 is a calibrated high-resolution image in the 2D space capturing the same surrounding environment 102 that was sensed by the vehicle's 120 radar system (and represented in 4D by the 4D MMW radar point cloud 103). As seen in FIG. 1, the input image 131 includes visual imagery of several objects that are located within the surrounding environment 102, including trees, traffic lights, pedestrians, and other vehicles, which are also previously detected in the vehicle's radar data.

In addition, FIG. 1 depicts an example of a 2D proposal 132 that can be created by the two-stage 3D object detection system 100, where proposals, shown as bounding boxes 133, are generated on the high-resolution input image 131 around the predicted positions of objects within the image. FIG. 1 illustrates that generating the 2D proposal 132 is also based on radar data input, namely the 3D ROI proposal 104. In order to generate the 2D proposal 132, the 3D ROI proposal 104 is projected into the 2D space which allows key features or points in the image to be detected and matched to corresponding features in the 3D space. The 2D proposal 132 can be generated by mapping the anchors in the 3D ROI proposal 104 to the input image 131 in the 2D plane. For example, a proposal, or bounding box 133, is created around each anchor that is included in the 3D ROI proposal 104, where the anchors represent detected objects (or key points). Each bounding box 133 in the 2D proposal 132 indicates the potential presence of an object, and its approximate location and size in the image 131. Furthermore, the 2D proposal 132 is result of the two-stage 3D object detection system's 100 capability to fuse together radar data and camera data.

FIG. 1 illustrates that a 2D object detection result 140 ca be generated by the two-stage 3D object detection system 100 by inputting the 2D proposal 132 into anchor-based object detection networks. The anchor-based object detection networks can be deep learning models that are trained to detect and localize objects in images. For instance, anchor-based object detection networks can detect whether an object is present within each of the anchor bounding boxes 133 in the 2D proposal 132. Furthermore, when the anchor-based object detection networks determine that an object is present within an anchor bounding box 133, then the network can adjust the bounding boxes to fit more precisely around the object's position and more accurately localize the object within the anchor. Thus, FIG. 1 shows that the 2D object detection result 140 includes class, and 2D bounding boxes 141 only at anchors that correspond to actual objects that are deemed points of interest (as opposed to background) in the image. As seen in FIG. 1, the 2D object detection result 140 has 2D bounding boxes around the vehicles and a pedestrian that are in the image 131, which are objects that can move and thus are important for the vehicle 120 to accurately detect and track (e.g., changes in position) in its surrounding environment. In contrast, the 2D object detection result 140 does not have any bounding boxes around the trees and traffic lights in the image 131, which are stationary objects (e.g., background) in the environment and may not be as critical to detect.

FIG. 1 also depicts that the two-stage 3D object detection system 100 generates a 3D object detection result 150 that includes 3D bounding boxes 151 around detected objects in the 3D space. The 3D object detection result 150 can be generated from applying a non-maximum suppression (NMS) to the 2D object detection results 140, which filters out any duplicate and/or overlapping detections, thereby keeping only the most confident and non-overlapping predictions in the results. The 2D object detection results 141 can then be backtracked into the 3D space using the radar data. For instance, the 3D position and orientation of detected objects in the 2D detection results 140 can be estimated within the 3D ROI proposal (providing a structure of the 3D scene) based on the vehicle's 120 radar images. Again, the two-stage 3D object detection system 100 leverages a fusion of camera data and radar data in order to represent object detection that was initially performed in the 2D space to generate the 3D object detection result 150 which identifies and locates objects in the 3D space. FIG. 1 illustrates the 3D object detection results 150 as a 3D scene (from radar imagery) of the vehicle's surroundings, which includes 3D bounding boxes 151 that represent the spatial position (x,y,z) of each detected object in the 3D space, class, and orientation (yaw, pitch, roll) of each detected object in the 3D space.

Cameras generally have a higher resolution than radar technology, such as LiDAR, but cameras have a limited field of view and sometimes inaccurately estimate object distances. Thus, the two-stage 3D object detection system 100 generates a correspondence between the points detected by the camera sensors and the points detected by the radar sensors using fusion techniques, which integrate the strengths of each sensor, compensates for their limitations, and produces a more comprehensive and accurate representation of the surrounding environment. According to the embodiments, the two-stage 3D object detection system 100 implements an accurate and reliable 3D object detection using fusion of data from the vehicle's 120 radar sensors and camera sensors that provides a robust understanding of its surrounding environment in the 3D space (e.g., precise positions and orientations of detected objects in the 3D world). The 3D object detection result 150 can be used by the vehicle 120 to support various capabilities related to autonomous control, such as perception and decision-making. Once objects are accurately detected, using two-stage 3D object detection system 100, the vehicle 120 may perform other related functions, such as tracking the detected objects over time to understand their movement patterns an predict their future positions. The vehicle 120 can use the 3D object detection result 150 to understand the driving environment 102, identify potential hazards, and plan safe and efficient driving routes. Thus, the two-stage 3D object detection system 100 implements enhanced 3D object detection (by leveraging sensor fusion) in a manner that realizes safe and efficient autonomous vehicle operation, for instance allowing the vehicle 120 to navigate safely, avoid obstacles, and respond to dynamic changes in the surrounding environment while operating autonomously. For example, the two-stage 3D object system 100 can generate 3D object detection results 150 that detect and track movement of the pedestrian in the surrounding environment 102, thereby enabling the autonomous vehicle 120 to execute the appropriate autonomous actions, such as decelerating to a complete stop to avoid the pedestrian while they are crossing the roadway in front of vehicle 120.

In the example of FIG. 1, the vehicle 120 can be a sensor-rich vehicle (SRV) that is equipped with a plurality of vehicles sensors, described herein as ranging sensors (e.g., cameras, LIDAR, radar, ultrasonic sensors) and, in some cases, advanced computational resources. Accordingly, as an SRV, vehicle 120 is enabled to utilize these advances sensors to sense various conditions on the roadway, and obtain data that is pertinent to the driving environment 102, for instance capturing video (e.g., camera) of a roadway to detect objects. Data obtained by vehicle 120 can include, but is not limited to: vehicle identifiers; the presence of other vehicles; vehicle position; vehicle speed; vehicle movement; vehicle motion direction; road data; lane data; vehicle acceleration; other static and dynamic objects; image data; planned route data, generated HD local map, processed perception data, and the like. Additionally, the vehicle 120 can have sensor capabilities that are associated with legacy vehicles (LVs), having sensors that are capable of sensing and communicating more basic types of vehicle data, such as vehicle identifiers, vehicle location, vehicle speed, vehicle acceleration, and the like. For example, the vehicle 120 can include Global Positioning System (GPS) sensors, which can provide the basic location, velocity, and acceleration of the vehicle, such as warehouses, hospitals, road intersections, and the like.

In the example of FIG. 1, the vehicle 120 in which embodiments of the disclosed technology may be implemented is illustrated. Although the example described with reference to FIG. 1 is a type of autonomous vehicle, the systems and methods described herein can be implemented in other types of vehicles including semi-autonomous vehicles, vehicles with automatic controls (e.g., dynamic cruise control), or other vehicles. Also, the example vehicle 120 described with reference to FIG. 1 maybe a type of hybrid electric vehicle (HEV). However, this is not intended to be limiting, and the disclosed embodiments can be implemented in other types of vehicles including gasoline- or diesel-powered vehicles, fuel-cell vehicles, electric vehicles, or other vehicles.

In an embodiment, various entities, namely the autonomous vehicle 120 is configured to implement various aspects of the two-stage 3D object detection system 100. The two-stage 3D object detection functions may be carried out using the controller 121. For example, the two-stage 3D object detection controller 121 is configured to perform the method implementing the two-stage 3D object detection and data fusion described in greater detail in reference to FIG. 2.

Alternatively, the disclosed capabilities may be implemented on remote computer system such as a server, namely an edge server, within a vehicular network (e.g., V2C, V2V, V2X, V2I, etc.) that supports communication between the other communicatively connected entities within the vicinity. Thus, a vehicular network allows the vehicle 120 to function as a "connected vehicle" being commutatively to other vehicles and a computer system implementing the two-stage 3D object detection functions described herein, as well as other edge devices, other vehicles, and/or a cloud server through V2X communication comprising V2I, V2C, C2V and/or V2V communications.

For example, the two-stage 3D object detection controller 121 might implemented as hardware processor(s), or a computing device that include one or more processors, controllers, control modules, or other processing devices. Alternatively, aspects of the controller 122 may be implemented as software on a computer system, such as instructions, machine-readable code, or computer program components. It should also be appreciated upon studying the present disclosure that in one or more embodiments the functions or elements of the two-stage 3D controller 121 may reside on board a vehicle, such as autonomous vehicle 120. For example, all or part of computer system may reside within vehicle 120 and their functionalities may be performed thereby.

Figure 2:
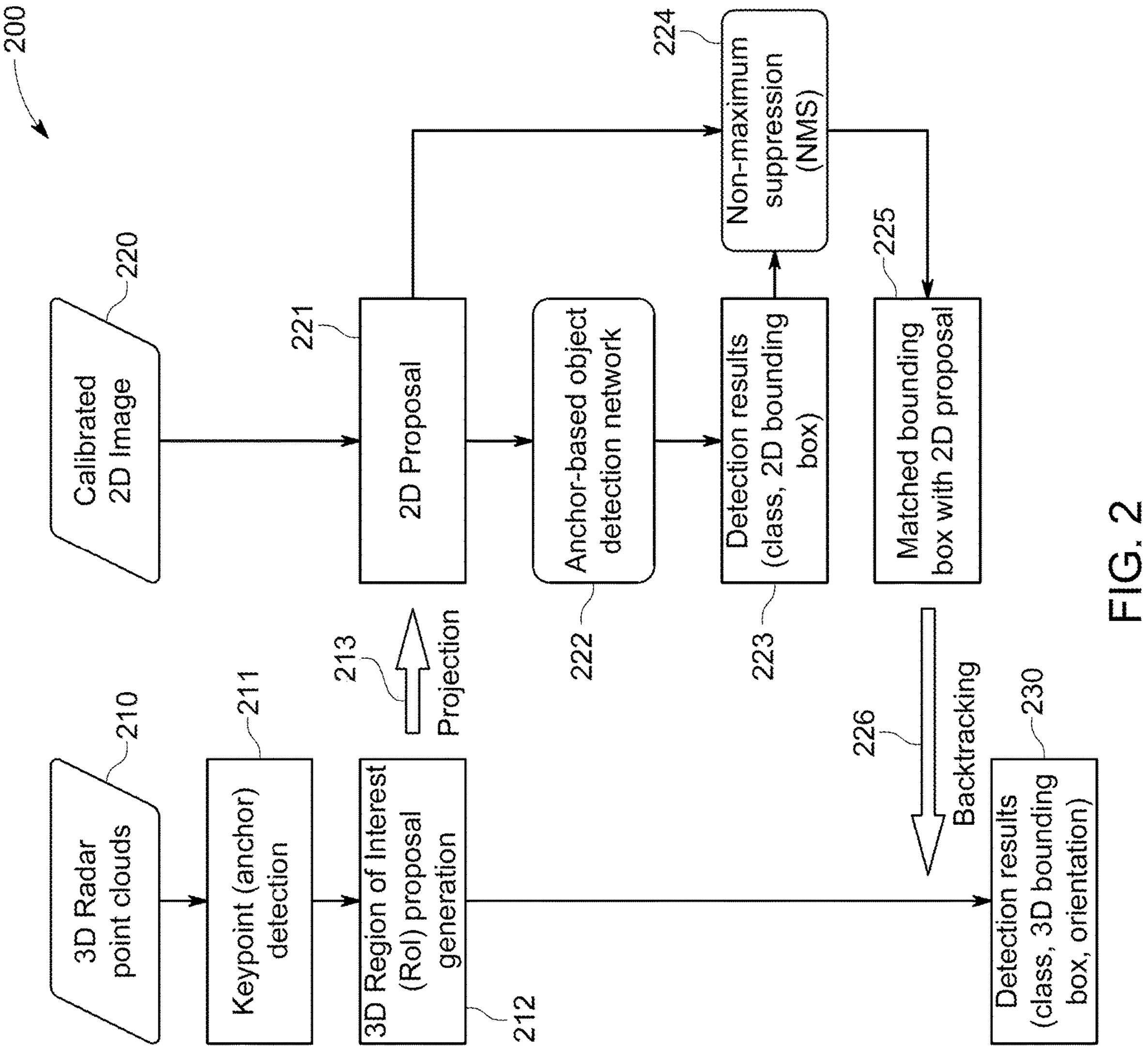
FIG. 2 is a flow diagram for an example method implementing the two-stage 3D object detection techniques including data fusion of the system shown in FIG. 1, according to one embodiment.

FIG. 2 is a flow diagram of a method 200 implementing the two-stage 3D object detection using sensor fusion techniques, disclosed herein. As a general description, the method 200 involves fusing together radar data and camera data in a manner that provides enhanced object detection for autonomous vehicle applications. FIG. 2 illustrates that method 200 can be considered a two-stage process, depicting the first stage as a sub-process of operations 210-212 that analyzes 3D measurement radar data; and a second stage as a sub-process of operations 220-225 that analyzes calibrated higher resolution camera data. The process 200 can be a series of executable operations in a machine-readable storage media performed by a hardware processor. A computing component can be a computer device used for implementing the disclosed two-stage 3D object detection functions described herein. For example, the computing component may be the controller of a vehicle implementing the two-stage 3D object detection system described above in reference to FIG. 1. In another implementation, the computing component executing process 200 is a computer system that is external to the vehicle, such as an edge/cloud server, which can perform the analysis remotely before it is subsequently deployed to the vehicle for use.

The method begins in operation 210 where 3D radar point clouds are received as radar data. A 3D radar point cloud is a collection of data points in the three-dimensional space obtained from radar sensor. As previously described, a vehicle can be equipped with a radar sensor that detects the presence of objects (e.g., within the operable range of the radar technology). For instance, an on-vehicle radar sensor may calculate data related to the objects it detects, including distance, velocity, and angle. The radar data, namely a collection of the spatial coordinates (x,y,z) for each of the detected objects, can be used to form a point cloud representation. Each point in the cloud corresponds to a detected object or a reflection point, and the combination of all these points creates a 3D map of the surrounding environment. In some embodiments, the radar data cloud is received in operation 210 as a 4D MMW radar point cloud, where the data is obtained using 4D MMW radar technology that has the capability to add an extra dimension (e.g., time) to conventional 3D representation.

Thereafter, in operation 211, the 3D radar point cloud is analyzed to detect pertinent key points. Key points can be considered as the dynamic objects that have been detected by radar, and represented in the 3D radar point clouds. The key points are represented as anchors (e.g., for a 3D bounding box), and each anchor is associated with the presence and/or location of dynamic objects within the radar image. Operation 211 can involve applying techniques from computer vision and point cloud processing in order to detect the key points, where feature extraction approaches are utilized to identify the significant points in the 3D radar point cloud. In some embodiments, operation 211 includes foreground point cloud segmentation. As a general description, foreground point cloud segmentation is the process of separating the foreground or relevant objects from the background of a 3D radar point cloud. For instance, in a 3D radar point cloud, the foreground points correspond to the objects of interest, such as vehicles, pedestrians, or any other relevant structures.

Next, at operation 212, a 3D Region of Interest (ROI) proposal is generated. The 3D ROI proposal is a subset (or portion) of a 3D point cloud that is identified as potentially containing objects or ROIs. In other words, the 3D ROI proposal is a localized area within the 3D space that is likely to be relevant for object detection. Therefore, operation 212 can involve identifying and localizing areas within the 3D radar point cloud that are likely to contain relevant objects or ROIs, based on the key points that are detected in previous operation 211.

At this point in the method 200, the first stage, namely the radar data analysis, is dependent on information from the camera data analysis performed in the second stage. Thus, reference is now made to operation 220 which receives the camera data as input for further analysis. According to an embodiment, the camera data received in operation 220 as calibrated high-resolution camera data in the 2D space. Calibrated high-resolution camera data refers to camera data that has undergone a calibration process to ensure its accuracy and reliability. For example, a vehicle can obtain calibrated high-resolution camera data in 2D from its on-vehicle cameras, where detailed images and video of the vehicle's surroundings are captured.

Subsequently, at operation 221, a 2D proposal is generated from the calibrated high-resolution camera data that is in 2D (received from previous operation 220) and the 3D ROI proposal created from radar data (received from previous operation 212). Operation 221 can utilize several computer vision and image processing functions to generate the 2D proposal. In order to generate a proposal projection, key features or points in the image are detected and matched to corresponding features. This can involve projection 213 of radar data from the 3D space. FIG. 2 illustrates that a projection 213 of the 3D ROI proposal from operation 212, which includes detected key points (or anchors), is performed into the 2D plane. The projection 213 can be achieved by mapping the anchors in the 3D proposal back onto the 2D image plane. After the anchors (representing detected objects) in the 3D scene of radar data are projected onto the 2D high resolution images of camera data, then the proposal projection can be generated. Using the 2D projection, a proposal (or bounding box) is created around the objects of interest, indicating their approximate location and size in the images. Operation 221 can generate a resulting 2D proposal projection, which contains information about the key objects that are present in the 3D scene. In other words, the anchors from the 3D ROI proposal can be used to generate the proposals on the 2D camera images. The 2D proposal generated in operation 221 can then be utilized for object detection.

In method 200, the object detection functions are implemented by employing an anchor-based object detection network. At operation 222, the 2D proposal from previous operation 221 can be input into the anchor-based object detection network. An anchor-based object detection network is a type of deep learning model that is used for detecting and localizing objects in images. As previously discussed, the 3D ROI proposal includes anchors that are associated with objects that have been detected using radar. The anchors are predefined bounding boxes of different sizes and aspects ratios that are placed at various positions across the image. These anchors act as potential candidate regions where objects might be present. The anchor-based object detection network uses the anchors to make predictions about the presence of objects and their positions.

By applying the anchor-based object detection network, operation 222 can involve applying a deep learning model that is trained to predict whether an object is present at each anchor. For example, the anchor-based object detection network may calculate a probability estimate indicating a likelihood of the actual presence of an object at each respective anchor. Thereafter, if an object is present, the anchor-based object detection network refines the coordinates of the bounding box to accurately localize the object within the anchor.

The method 200 continues to operation 223, where 2D object detection results are obtained from employing the anchor-based object detection network in previous operation 222. The 2D object detection results can be an image of the vehicle's surroundings in the 2D space that includes 2D bounding boxes (around detected objects) and class information. That is, 2D bounding boxes are initially based on the positions of the anchors, and then are further adjusted to tightly fit around the detected objects to provide high accuracy with respect to the location (and size) of detected objects. Thus, the 2D object detection results indicate the predictions of the objects that are present in the input image that are made by the anchor-based object detection network. Based on the 2D object detection results obtained in operation 222, objects that are present in an image can be detected, and their corresponding locations identified.

At operation 224, a non-maximum suppression (NMS) is applied to the 2D object detection results from previous operation 223 and the 2D proposal from previous operation 221. The NMS is a form of post-processing, that can filter out duplicate and/or overlapping detections, thereby keeping only the most confident and non-overlapping predictions in the results.

Then, at operation 225, bounding boxes are matched with the 2D proposal. Operation 225 involves associating the bounding boxes with ground truth objects that are present in the image, which is a key step in determining which bounding boxes correspond to actual objects in the image.

The method 200 then performs a backtracking at operation 226, which utilizes the 2D object detection results to generate 3D object detection results in operation 230. Backtracking from 2D object detection results to 3D object detection results can involve estimating the 3D position and orientation of detected objects in the real-world environment based on the 2D detections obtained from the camera images and the 3D ROI proposal (providing a structure of the 3D scene) generated in previous operation 212 based on the radar images. The 3D object detection results generated in operation 230 extrapolates the object detection that was initially performed in the 2D space in order to identify and locate objects in the 3D environment provided by the radar-based 3D point cloud input. Therefore, the 3D object detection results can present object detection in a more perceptually-rich manner in comparison to the 2D results, by providing additional information about the detected objects, such as position and orientation in the 3D space which goes beyond the 2D image or frame. For example, 3D object detection results can be a 3D scene (from radar imagery) of a vehicle's surroundings, which includes 3D bounding boxes that represent the spatial position (x,y,z) of each detected object in the 3D space, class, and orientation (yaw, pitch, roll) of each detected object in the 3D space. Therefore, method 200 ultimately achieves an accurate and reliable 3D object detection using fusion of data from radar and camera sensors that provides a comprehensive understanding of a surrounding environment in 3D (e.g., precise positions and orientations of detected objects in the 3D world), and can be utilized to realize safe and efficient autonomous vehicle operation.

FIG. 3 illustrates a vehicle 300, for instance an autonomous vehicle, configured for implementing the disclosed two-stage 3D object detection capabilities. In particular, FIG. 3 depicts the vehicle 300 including a two-stage 3D object detection component 314. According to the disclose embodiments, the two-stage 3D object detection component 314 is configured to perform an accurate and reliable 3D object detection that includes a distinct technique for fusing camera data and radar data. In some implementations, vehicle 300 may also include sensors 308, electronic storage 332, processor(s) 334, and/or other components. Vehicle 300 may be configured to communicate with one or more client computing platforms 304 according to a client/server architecture and/or other architectures. In some implementations, users may access vehicle 300 via client computing platform(s) 304.

Sensors 308 may be configured to generate output signals conveying operational information regarding the vehicle. The operational information may include values of operational parameters of the vehicle. The operational parameters of vehicle 300 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 300 tires and roadway, distance from center of gravity of vehicle 300 to front axle, distance from center of gravity of vehicle 300 to rear axle, total mass of vehicle 300, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 300. In some implementations, at least one of sensors 308 may be a vehicle system sensor included in an engine control module (ECM) system or an electronic control module (ECM) system of vehicle 500. In some implementations, at least one of sensors 308 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 300.

In some implementations, sensors 308 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 300. In some implementations, sensors may also include sensors within nearby vehicles (e.g., communicating with the subject vehicle via V to V or other communication interface) and or infrastructure sensors (e.g., communicating with the subject vehicle via the V2I or other communication interface).

Sensors 308 may be configured to generate output signals conveying visual and/or contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.)), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far-left lane of a four-lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 308 may include virtual sensors, imaging sensors, depth sensors, cameras, and/or other sensors. As used herein, the term “camera”, “sensor” and/or “image sensor” and/or “imaging device” may include any device that captures images, including but not limited to a single lens-based camera, a calibrated camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. The visual information captured by sensors 308 can be in the form of digital images and/or video that includes red, green, blue (RGB) color values representing the image. Information captured by one or more sensors may be marked, time-stamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 332, such that captured information may be stored, at least initially, in the integrated embedded storage of a particular vehicle, e.g., vehicle 300. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through “the cloud.”

Vehicle 300 may be configured by machine-readable instructions 306. Machine-readable instructions 306 may include one or more instruction components. The instruction components may include computer program components. The instruction components may include one or more of: two-stage 3D object detection component 314; a controller 316, and/or other instruction components.

As a general description, the illustrated components within the machine-readable instructions 306 include the two-stage 3D object detection component 314. As previously described in reference to FIG. 1, the two-stage 3D object detection component 314 is configured to implement an accurate and reliable 3D object detection function. Thus, the two-stage 3D object detection component 314 can utilize one or more vehicle sensors 308 (e.g., camera) to capture perceptual data, such a video and radar images, which can be fused to perform object detection in the 3D space.

Figure 4:
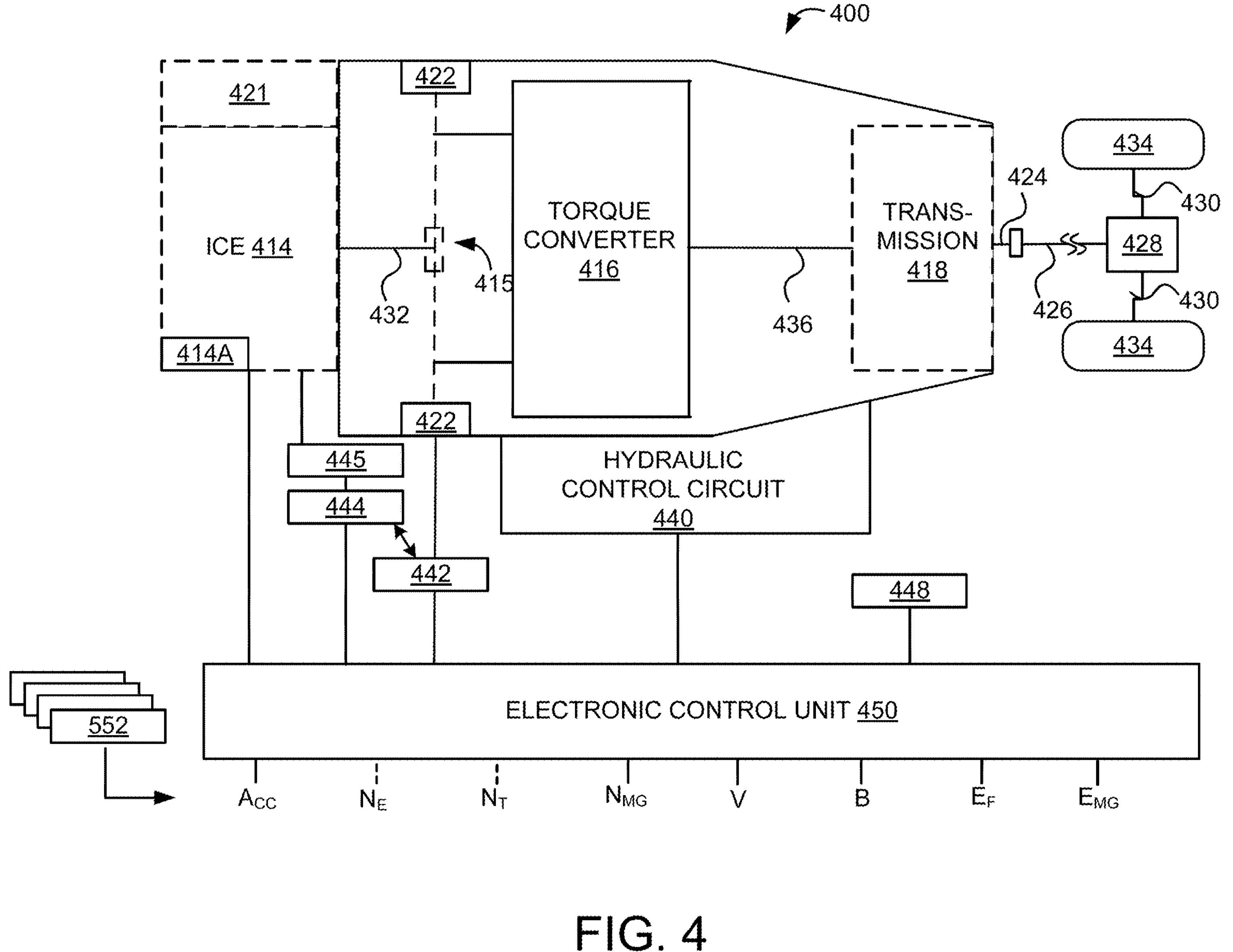
FIG. 4 depicts an example vehicle in which the systems and methods disclosed herein may be applied.

Another example vehicle in which embodiments of the disclosed technology may be implemented is illustrated in FIG. 4. The vehicle 400 may implement the autonomous vehicle and two-stage 3D object detection techniques disclosed herein (as shown in FIG. 1). Additionally, the vehicle 400 can be a full electric vehicle (EV), or other type of electric-based vehicles including, fuel-cell vehicles, hybrid electric vehicles, or other vehicles.

FIG. 4 illustrates a drive system of an electric vehicle 400 that may include an EV battery 421, which stores electric powered, and one or more electric motors 422, which receive electric power from the EV battery 421, as sources of motive power. Driving force generated by the electric motors 422 can be transmitted to one or more wheels 434 via, a transmission 418, a differential gear device 428, and a pair of axles 430.

Vehicle 420 may be driven/powered with the electric motor(s) 422 as the drive source for travel. For example, a travel mode may be an EV travel mode that uses the electric motor(s) 422 as the source of motive power. Thus, in EV travel mode, vehicle 420 is powered by the motive force generated by the electric motor 422. In some implementations, another travel mode may be a hybrid electric vehicle (HEV) travel mode that uses the electric motor(s) 422 and an engine (not shown) as the sources of motive power.

As alluded to above, electric motor 422 can be used to provide motive power in vehicle 420 and is powered electrically via a battery 421 (and supplemental battery 444). Battery 421 may be implemented as one or more batteries or other power storage devices including, for example, lead-acid batteries, lithium ion batteries, capacitive storage devices, and so on. Battery 621 may be charged by a battery charger 445. Battery 421 may also be charged by the electric motor 422 such as, for example, by regenerative braking or by coasting during which time motor 422 operate as generator.

Electric motor 422 can be powered by battery 421 to generate a motive force to move the vehicle 420 and adjust vehicle speed. Electric motor 422 can also function as a generator to generate electrical power such as, for example, when coasting or braking. Battery 421 may also be used to power other electrical or electronic systems in the vehicle. Electric motor 422 may be connected to battery 421 via an inverter 442. Battery 421 can include, for example, one or more batteries, capacitive storage units, or other storage reservoirs suitable for storing electrical energy that can be used to power the electric motor 422. When battery 421 is implemented using one or more batteries, the batteries can include, for example, nickel metal hydride batteries, lithium-ion batteries, lead acid batteries, nickel cadmium batteries, lithium-ion polymer batteries, and other types of batteries.

An electronic control unit 450 (described below) may be included and may control the electric drive components of the vehicle as well as other vehicle components. For example, electronic control unit 450 may control inverter 442, adjust driving current supplied to electric motor 422, and adjust the current received from electric motor 422 during regenerative coasting and braking As a more particular example, output torque of the electric motor 422 can be increased or decreased by electronic control unit 650 through the inverter 442.

As alluded to above, vehicle 420 may include an electronic control unit 450. Electronic control unit 450 may include circuitry to control various aspects of the vehicle operation. Electronic control unit 450 may include, for example, a microcomputer that includes a one or more processing units (e.g., microprocessors), memory storage (e.g., RAM, ROM, etc.), and I/O devices. The processing units of electronic control unit 450, execute instructions stored in memory to control one or more electrical systems or subsystems in the vehicle. Electronic control unit 450 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS, ESC, or regenerative braking system), battery management systems, and so on. These various control units can be implemented using two or more separate electronic control units or using a single electronic control unit.

In the example illustrated in FIG. 4, electronic control unit 450 receives information from a plurality of sensors included in vehicle 420. For example, electronic control unit 450 may receive signals that indicate vehicle operating conditions or characteristics, or signals that can be used to derive vehicle operating conditions or characteristics. These may include, but are not limited to accelerator operation amount, ACC, a revolution speed, NE, rotational speed, NMG, of the motor 422 (motor rotational speed), and vehicle speed, NV. These may also include NT (e.g., output amps indicative of motor output), brake operation amount/pressure, B, battery SOC (i.e., the charged amount for battery 421 detected by an SOC sensor). Accordingly, vehicle 420 can include a plurality of sensors 452 that can be used to detect various conditions internal or external to the vehicle and provide sensed conditions to engine control unit 450 (which, again, may be implemented as one or a plurality of individual control circuits). In one embodiment, sensors 452 may be included to detect one or more conditions directly or indirectly such as, for example, fuel efficiency, EF, motor efficiency, EMG, hybrid (internal combustion engine 14+MG 12) efficiency, acceleration, ACC, etc.

Additionally, the one or more sensors 452 can be configured to detect, and/or sense position and orientation changes of the vehicle 420, such as, for example, based on inertial acceleration. In one or more arrangements, the electronic control unit 450 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, the electronic control unit 450 receives signals from a speedometer to determine a current speed of the vehicle 420.

In some embodiments, one or more of the sensors 452 may include their own processing capability to compute the results for additional information that can be provided to electronic control unit 450. In other embodiments, one or more sensors may be data-gathering-only sensors that provide only raw data to electronic control unit 450. In further embodiments, hybrid sensors may be included that provide a combination of raw data and processed data to electronic control unit 450. Sensors 452 may provide an analog output or a digital output. Additionally, as alluded to above, the one or more sensors 452 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 452 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 452 can be configured to acquire, and/or sense driving environment data. For example, environment sensors can be configured to detect, quantify and/or sense objects in at least a portion of the external environment of the vehicle 420 and/or information/data about such objects. Such objects can be stationary objects and/or dynamic objects. Further, the sensors can be configured to detect, measure, quantify and/or sense other things in the external environment of the vehicle 420, such as, for example, lane markers, signs, traffic lights, traffic signs, lane lines, crosswalks, curbs proximate the vehicle 420, off-road objects, etc.

Sensors 452 may be included to detect not only vehicle conditions but also to detect external conditions as well. Sensors that might be used to detect external conditions can include, for example, sonar, radar, lidar or other vehicle proximity sensors, and cameras or other image sensors. In some embodiments, cameras can be high dynamic range (HDR) cameras or infrared (IR) cameras. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Accordingly, the one or more sensors 452 can be configured to acquire, and/or sense driving environment data. For example, environment sensors can be configured to detect, quantify and/or sense objects in at least a portion of the external environment of the vehicle 420 and/or information/data about such objects. Such objects can be stationary objects and/or dynamic objects. Further, the sensors can be configured to detect, measure, quantify and/or sense other things in the external environment of the vehicle 420, such as, for example, lane markers, signs, traffic lights, traffic signs, lane lines, crosswalks, curbs proximate the vehicle 420, off-road objects, etc.

Figure 5:
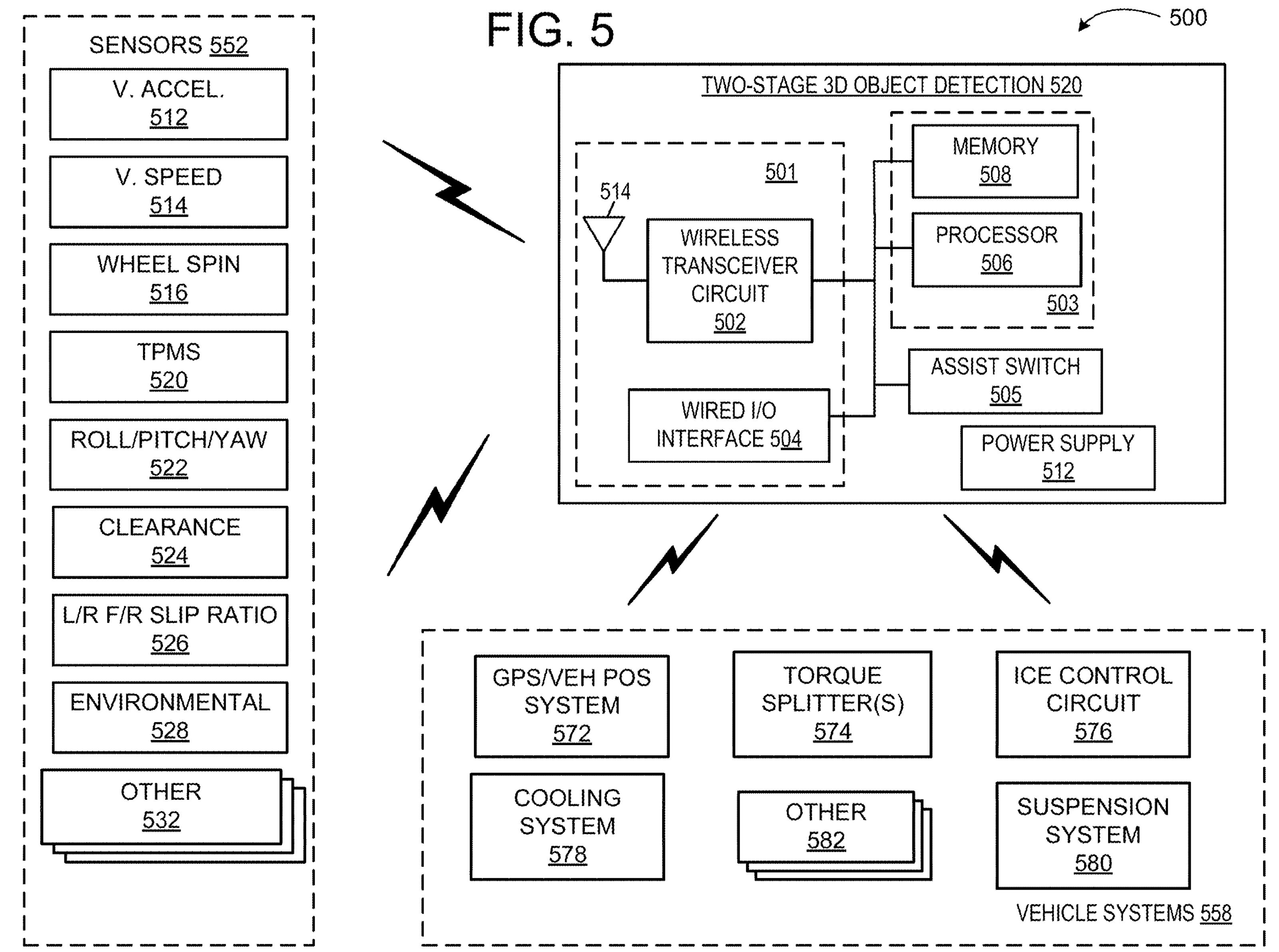
FIG. 5 depicts an example architecture of an in-vehicle two-stage 3D object detection system, according to one embodiment.

FIG. 5 illustrates an example of a two-stage 3D object detection controller circuit 520 implemented in a vehicle 500 in accordance with one embodiment of the systems and methods described herein. The vehicle 500 includes a two-stage 3D object detection controller circuit 520 communicatively connected to a plurality of sensors 552, a plurality of vehicle systems 558, a database 515 comprising roadway data, and a database 517 comprising right-of-way rules. Sensors 552 and vehicle systems 558 wirelessly communicate with the two-stage 3D object detection controller circuit 520. Although in this example sensors 552 and vehicle systems 558 are depicted as communicating with the two-stage 3D object detection controller circuit 520, they can also communicate with each other as well as with other vehicle systems. The two-stage 3D object detection controller circuit 520 can be implemented as an ECU or as part of an ECU. In other embodiments, the two-stage 3D object detection controller circuit 520 can be implemented independently of the ECU.

The two-stage 3D object detection controller circuit 520 in this example includes a communication circuit 501, a controller/CPU 503, and a power supply 512. The controller/CPU 503 includes a processor 506 and memory 508. For example, the processor 506, and a memory 508 are configured for performing 3D object detection including the distinct technique for fusion of camera data and radar data.

Processor 506 can include one or more GPUs, CPUs, microprocessors, or any other suitable processing system. Processor 506 may include a single core or multicore processors. The memory 508 may include one or more various forms of memory or data storage (e.g., flash, RAM, etc.) that may be used to store instructions and variables for processor 506 as well as any other suitable information, such as, one or more of the following elements: rules data; resource data; GPS data; and base data, as described below. Memory 508 can be made up of one or more modules of one or more different types of memory, and may be configured to store data and other information as well as operational instructions that may be used by the processor 506.

Although the example of FIG. 5 is illustrated using processor and memory circuitry, as described below with reference to circuits disclosed herein, controller/CPU 503 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up the two-stage 3D object detection controller circuit 520. Communication circuit 501 includes either or both a wireless transceiver circuit 502 with an associated antenna 514 and a wired I/O interface with an associated hardwired data port (not illustrated). Communication circuit 501 can provide for V2X communications capabilities, allowing the two-stage 3D object detection controller circuit 520 to communicate with edge devices, such as roadside equipment (RSE), network cloud servers and cloud-based databases, and/or other vehicles.

As this example illustrates, communications with the two-stage 3D object detection controller circuit 520 can include either or both wired and wireless communications circuits 501. Wireless transceiver circuit 502 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 514 is coupled to wireless transceiver circuit 502 and is used by wireless transceiver circuit 502 to transmit radio signals wirelessly to wireless equipment with which it is connected and to receive radio signals as well. These RF signals can include information of almost any sort that is sent or received by the two-stage 3D object detection controller circuit 520 to/from other entities such as sensors 552 and vehicle systems 558.

Power supply 512 can include one or more of a battery or batteries (such as, e.g., Li-ion, Li-Polymer, NiMH, NiCd, NiZn, and NIH2, to name a few, whether rechargeable or primary batteries), a power connector (e.g., to connect to vehicle supplied power, etc.), an energy harvester (e.g., solar cells, piezoelectric system, etc.), or it can include any other suitable power supply.

In the illustrated example, sensors 552 include vehicle acceleration sensors 521, vehicle speed sensors 522, wheelspin sensors 523 (e.g., one for each wheel), environmental sensors 528 (e.g., to detect salinity or other environmental conditions), proximity sensor 530 (e.g., sonar, radar, lidar or other vehicle proximity sensors), and image sensors 560. Additional sensors (i.e., other sensors 532) can be included as may be appropriate for a given implementation of vehicular 500.

The sensors 552 include front facing image sensors 564, side facing image sensors 566, and/or rear facing image sensors 568. Image sensors may capture information which may be used in detecting not only vehicle conditions but also detecting conditions external to the vehicle 500 as well. Image sensors that might be used to detect external conditions can include, for example, cameras or other image sensors configured to capture data in the form of sequential image frames forming a video in the visible spectrum, near infra-red (IR) spectrum, IR spectrum, ultraviolet spectrum, etc. Image sensors 560 can be used to, for example, to detect objects in an environment surrounding vehicle 500, for example, traffic signs indicating a current speed limit, road curvature, obstacles, surrounding vehicles, and so on. For example, one or more image sensors 560 may capture images of neighboring vehicles in the surrounding environment. As another example, object detecting and recognition techniques may be used to detect objects and environmental conditions, such as, but not limited to, road conditions, surrounding vehicle behavior (e.g., driving behavior and the like), parking availability, etc. Additionally, sensors may estimate proximity between vehicles. For instance, the image sensors 560 may include cameras that may be used with and/or integrated with other proximity sensors 530 such as LIDAR sensors or any other sensors capable of capturing a distance. As used herein, a sensor set of a vehicle may refer to sensors 552 and image sensors 560 as a set.

Vehicle systems 558 include any of a number of different vehicle components or subsystems used to control or monitor various aspects of the vehicle and its performance. In this example, the vehicle systems 558 includes a vehicle positioning system 572; vehicle audio system 574 comprising one or more speakers configured to deliver audio throughout the vehicle; object detection system 578 to perform image processing such as object recognition and detection on images from image sensors 560, proximity estimation, for example, from image sensors 560 and/or proximity sensors, etc. for use in other vehicle systems; suspension system 580 such as, for example, an adjustable-height air suspension system, or an adjustable-damping suspension system; and other vehicle systems 582 (e.g., Advanced Driver-Assistance Systems (ADAS), such as forward/rear collision detection and warning systems, pedestrian detection systems, autonomous or semi-autonomous driving systems, and the like).

The vehicle positioning system 572 includes a global positioning system (GPS). Vehicle 500 may be DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

Conventional GPS communication includes a GPS satellite in communication with a vehicle comprising a GPS tracking device. The GPS tracking device emits/receives a signal to/from the GPS satellite. For example, a GPS tracking device is installed into a vehicle. The GPS tracking device receives position data from the GPS tracking device. The position data gathered from the vehicle is stored in the tracking device. The position data is transmitted to the cloud server via a wireless network.

A conventional GPS provides positional information that describes a position of a vehicle with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by an Advanced Driver Assistance System (ADAS) of a modern vehicle require positioning information that describes the location of the vehicle with lane-level accuracy. In addition, the current standard for DSRC requires that the location of the vehicle be described with lane-level accuracy.

As used herein, the words "geographic location," "location," "geographic position" and "position" refer to a latitude and longitude of an object (or, a latitude, longitude, and elevation of an object), such as a connected vehicle, an RSE, a client device, etc. As used herein, the words "geographic area", and "area," refer to a physical space surrounding a location (e.g., an area of defined space surrounding a geographic location or geographic position). The example embodiments described herein may provide positioning information that describes a geographic position of a vehicle with an accuracy of one or more of: (1) at least plus or minus 1.5 meters in relation to the actual geographic position of the vehicle in two dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Network 590 may be a conventional type of network, wired or wireless, and may have numerous different configurations including a star configuration, token ring configuration, or other configurations. Furthermore, the network 590 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 590 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VOLTE, 5G-V2X or any other mobile data network or combination of mobile data networks. Further, the network 590 may include one or more IEEE 802.11 wireless networks.

In one embodiment, data comprising the location of vehicle is captured by the vehicle position system 558. The vehicle position system 558 can include one or more sensors 552 configured to capture vehicle position data. The vehicle positioning system 572 communicates with the two-stage 3D object detection controller circuit 520 to communicate and utilize knowledge at the vehicle 500 for various driving and/or maneuvering functions, including autonomous or semi-autonomous vehicle/driver safety features.

In an embodiment, the two-stage 3D object detection controller circuit 520 produces notifications for the driver of the vehicle 500 using one or more notification methods. For example, the driver may receive a visual and/or audible notification that they are approaching an identified risky zone, based on two-stage 3D object detection controller circuit 520 has received in accordance with knowledge networking capabilities, as disclosed herein. In one embodiment, the notification methods include the vehicle systems 558 comprising the vehicle audio system 572 and the vehicle dashboard system 576. The notification methods includes visual and/or audible methods of informing the driver of safety related issues. In one embodiment, the notification methods include notifying the driver of the vehicle 500 via one or more vehicle systems 558. For example, in one embodiment, the driver is notified of riskiness of a driving environment via the vehicle audio system 574 (e.g., instructions played/broadcasted over one or more vehicle speakers), the vehicle display system 580 and/or the vehicle dashboard system 576. In one embodiment, the driver is notified of safety issues by a navigation system within the instrument cluster and the dashboard GUI. The notification can include visual instructions (e.g., visual directions on how to proceed), and/or auditory instructions (e.g., verbal commands from the two-stage 3D object detection controller circuit 520 to the driver).

Figure 6:
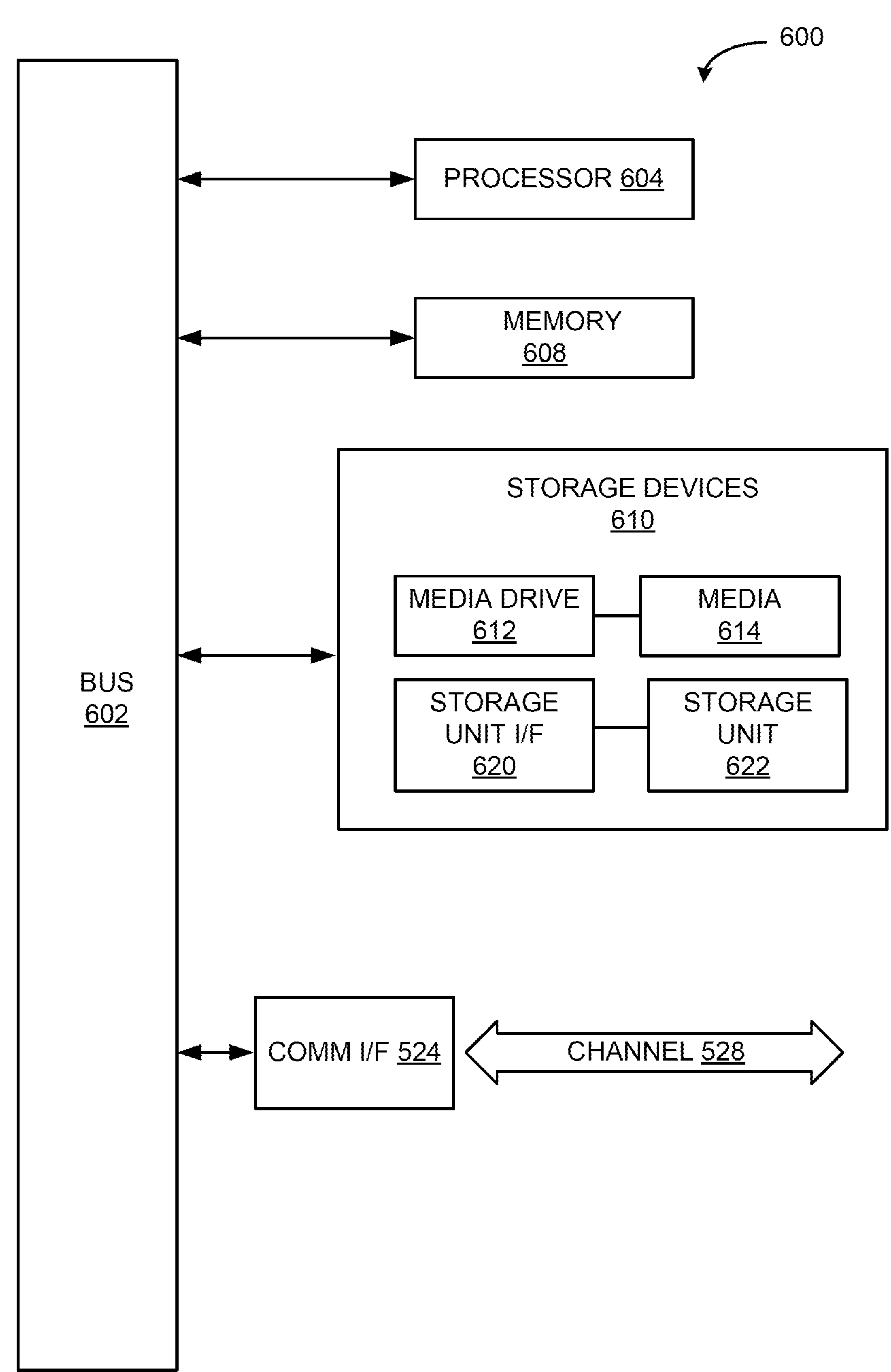
FIG. 6 is an example computing component that may be used to implement various features of embodiments described in the present disclosure.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 1002 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and the storage unit interface 620. Examples of such storage units 622 and storage unit interfaces 620 can include a program cartridge and cartridge interface, a removable memory (for example, a flash memory or other removable memory component) and memory slot. Other examples may include a PCMCIA slot and card, and other fixed or removable storage units 622 and storage unit interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit interface 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:

sensors capturing camera data and radar data, wherein the camera data and the radar data are associated with a driving environment of the vehicle, the driving environment comprising one or more objects, and wherein the radar data comprises a radar point cloud comprising spatial coordinates and velocity information; and a controller performing fusion of the camera data and the radar data to generate a three-dimensional (3D) object detection result comprising a position of the one or more objects in a 3D space associated with the driving environment of the vehicle, wherein the controller further:

generates, from the radar data, a 3D region of interest (ROI) proposal as a subset of the radar point cloud corresponding to the one or more objects indicated by the velocity information, the 3D ROI proposal comprising anchors representing detected key points;

projects the 3D ROI proposal into a two-dimensional (2D) proposal by mapping the anchors onto an image in a 2D image plane;

applies an anchor-based object detection network to the 2D proposal to obtain one or more refined 2D object detections;

back-projects each refined 2D object detection into 3D space using the radar data and the 3D ROI proposal to produce a 3D object detection result; and executes autonomous control of the vehicle based on the 3D object detection result.

2. The vehicle of claim 1, wherein the radar data comprises a four-dimensional (4D) millimeter-wave (MMW) radar point cloud.

3. The vehicle of claim 2, wherein the controller further performs analysis of the 4D MMW radar point cloud to detect key points associated with the one or more objects.

4. The vehicle of claim 3, wherein the analysis of the 4D MMW radar point cloud comprises foreground point cloud segmentation.

5. The vehicle of claim 3, wherein the 3D ROI proposal comprising anchors corresponds to the detected key points in the 4D MMW radar point cloud.

6. The vehicle of claim 5, wherein the camera data comprises a calibrated, undistorted high-resolution image in 2D, and wherein the controller maps the anchors onto the calibrated, undistorted high-resolution image in 2D.

7. The vehicle of claim 6, wherein the controller fuses the 3D ROI proposal and the high-resolution image to generate the 2D proposal.

8. The vehicle of claim 7, wherein the 2D proposal comprises proposals predicting the position of the one or more objects in the high-resolution image.

9. The vehicle of claim 8, wherein the proposals in the 2D proposal correspond to the anchors in the 3D ROI proposal.

10. The vehicle of claim 9, wherein the controller applies anchor-based object detection networks to the 2D proposal projection and generates 2D object detection results.

11. The vehicle of claim 10, wherein the 2D object detection results comprise 2D bounding boxes corresponding to the positions of the one or more objects in the high-resolution image detected using the anchor-based object detection networks.

12. The vehicle of claim 11, wherein the controller fuses the 2D object detection results with the 3D ROI proposal to generate 3D object detection results.

13. The vehicle of claim 11, wherein the 3D object detection results comprise 3D bounding boxes in the 3D space corresponding to the 2D bounding boxes of the 2D object detection results in the 2D space.

14. The vehicle of claim 13, wherein the 3D bounding boxes indicate the positions of the one or more objects in a 3D space associated with the driving environment of the vehicle.

15. The vehicle of claim 1, wherein the vehicle comprises an autonomous vehicle.

16. A method, comprising:

receiving camera data and radar data, wherein the camera data and the radar data are associated with a driving environment of a vehicle, the driving environment comprising one or more objects, and wherein the radar data comprises a radar point cloud comprising spatial coordinates and velocity information;

performing fusion of the camera data and the radar data to generate a three-dimensional (3D) object detection result comprising a position of the one or more objects in a 3D space associated with the driving environment of the vehicle, wherein the performing fusion further comprises:

generating, from the radar data, 3D region of interest (ROI) proposal as a subset of the radar point cloud corresponding to the one or more objects indicated by the velocity information, the 3D ROI proposal comprising anchors representing detected key points;

projecting the 3D ROI proposal into a two-dimensional (2D) proposal by mapping the anchors onto an image in a 2D image plane;

applying an anchor-based object detection network to the 2D proposal to obtain refined 2D object detections;

back-projecting each refined 2D object detection into the 3D space using the radar data and the 3D ROI proposal to produce the 3D object detection result; and executing autonomous control of the vehicle based on the 3D object detection result, wherein the autonomous control is associated with the driving environment.

17. The method of claim 16, wherein the radar data comprises a four-dimensional (4D) millimeter-wave (MMW) radar point cloud.

18. The method of claim 17, wherein the camera data comprises a high-resolution image in 2D.

19. The method of claim 18, wherein the 3D ROI proposal generated from the 4D MMW radar point cloud is fused with the high-resolution image to generate a 2D proposal projection.

20. The method of claim 19, wherein the 2D proposal projection comprises proposals predicting the position of the one or more objects in the high-resolution image.

* * * * *